United States Patent
Sun

(10) Patent No.: US 8,206,103 B2
(45) Date of Patent: Jun. 26, 2012

(54) FAN ASSEMBLY

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 411 days.

(21) Appl. No.: 12/490,346

(22) Filed: Jun. 24, 2009

(65) Prior Publication Data

US 2010/0260600 A1 Oct. 14, 2010

(30) Foreign Application Priority Data

Apr. 9, 2009 (CN) .......................... 2009 1 0301451

(51) Int. Cl.
*F04D 29/64* (2006.01)
(52) U.S. Cl. ..................... 415/213.1; 415/220
(58) Field of Classification Search ............... 415/213.1, 415/214.1; 416/244 R; 361/690, 694, 695
See application file for complete search history.

(56) References Cited

U.S. PATENT DOCUMENTS

| 7,118,334 | B2 * | 10/2006 | Winkler et al. | ............ 415/213.1 |
| 7,599,179 | B2 * | 10/2009 | Chen et al. | ................ 361/679.48 |
| 7,688,585 | B2 * | 3/2010 | Yin | ................ 361/695 |
| 2009/0034191 | A1 * | 2/2009 | Yin | ................ 361/695 |

* cited by examiner

*Primary Examiner* — Edward Look
*Assistant Examiner* — Dwayne J White
(74) *Attorney, Agent, or Firm* — Altis Law Group, Inc.

(57) ABSTRACT

A fan assembly includes a fan, two mounting members fixed to two opposite sides of the fan, and a fixing plate. Each of the mounting members includes an inner wall facing the fan and an outer wall away from the fan. The outer wall of each of the mounting members defines a recess and forms a block adjacent to a bottom of the mounting member. The blocks of the mounting members are adjacent to a first end of the fan. The fixing plate includes two engaging members respectively engaging in the recesses of the mounting members, a stop plate engaging with a second end opposite to the first end of the fan, and two resilient tabs respectively resisting against the blocks of the mounting members to sandwich the fan between the resilient tabs and the stop plate.

9 Claims, 3 Drawing Sheets

FAN ASSEMBLY

BACKGROUND

1. Technical Field

The present disclosure relates to heat-dissipating devices, and particularly, to a fan assembly.

2. Description of Related Art

In an ordinary computer system, a plurality of fans are secured by screws or the like to an enclosure of the computer system for producing a flow of cool air over certain electronic components within the enclosure, to dissipate heat generated by the closely spaced electronic components. However, as computer systems become smaller in size, electronic components become more tightly arranged within the enclosure of the computer system. When the plurality of fans are secured to and/or removed from the enclosure, use of a tool for screwing and/or unscrewing screws may cause damage to the electronic components, because there is no enough space for the tool within the enclosure of the computer system. In addition, the installation or removal of the screws is time consuming and troublesome.

DETAILED DESCRIPTION

Figure 1:
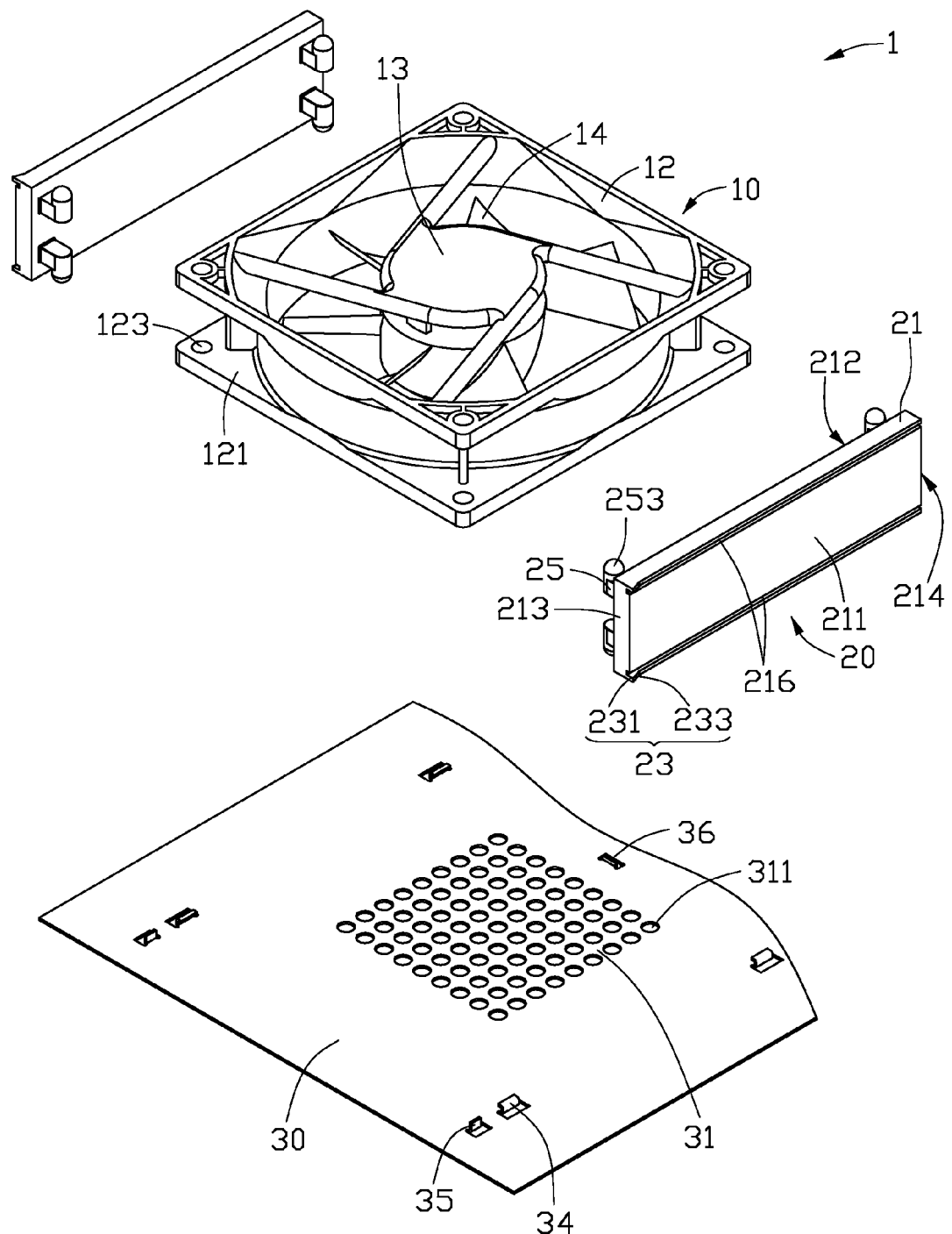
FIG. 1 is an exploded, isometric view of an embodiment of a fan assembly.

Referring to FIG. 1, an embodiment of a fan assembly 1 includes a fan 10, two mounting members 20, and a fixing plate 30.

The fan 10 includes a frame 12, a hub 13 installed in the frame 12, and a plurality of vanes 14 radially extending from the hub 13. The frame 12 includes two spaced parallel walls 121 located at opposite ends of the hub 13 correspondingly. Four fixing holes 123 are defined in each wall 121, adjacent to four corners of the wall 121 correspondingly.

Each mounting member 20 includes an elongated mounting plate 21. The mounting plate 21 includes an outer wall 211, an inner wall 212 opposite to the outer wall 211, a first end wall 213, and a second end wall 214 opposite to the first end wall 213. Two elongated recesses 216 are defined in an upper portion and a lower portion of the outer wall 211 of the mounting plate 21 correspondingly, with opposite ends of each recess 216 extending through the first end wall 213 and the second end wall 214. Two right-angled triangle shaped blocks 23 are formed on the outer wall 211 of the mounting plate 21, adjacent to the first end wall 213. One of the blocks 23 is arranged between a top of the mounting plate 21 and a corresponding recess 216 in the upper portion of the outer wall 211, and the other one of the blocks 23 is arranged between a bottom of the mounting plate 21 and a corresponding recess 216 in the lower portion of the outer wall 211. Each block 23 includes an engaging surface 231 perpendicular to the outer wall 211 and adjacent to the first end wall 213, and a slanted surface 233 connected between the engaging surface 231 and the outer wall 211. Four L-shaped latching arms 25 extend from four corners of the inner wall 212. Each latching arm 25 includes a latching portion 253 extending towards a corresponding one of the top and bottom of the mounting plate 21.

The fixing plate 30 may be a sidewall of a computer chassis in one exemplary embodiment. The fixing plate 30 includes a rectangular ventilation area 31 defining a plurality of vents 311. A first and a second engaging elements 34 are arranged in alignment on the fixing plate 30, at each side of two opposite sides of the ventilation area 31. Each of the first and second engaging elements 34 is generally L-shaped, and bent towards the ventilation area 31. A resilient tab 35 perpendicularly extends from the fixing plate 35, adjacent to the corresponding first engaging member 34 at each side of the ventilation area 31, and opposite to the second engaging member 34 relative to the first engaging member 34. A stop plate 36 extends from the fixing plate 30, between the second engaging members 34 at the opposite sides of the ventilation area 31.

Figure 2:
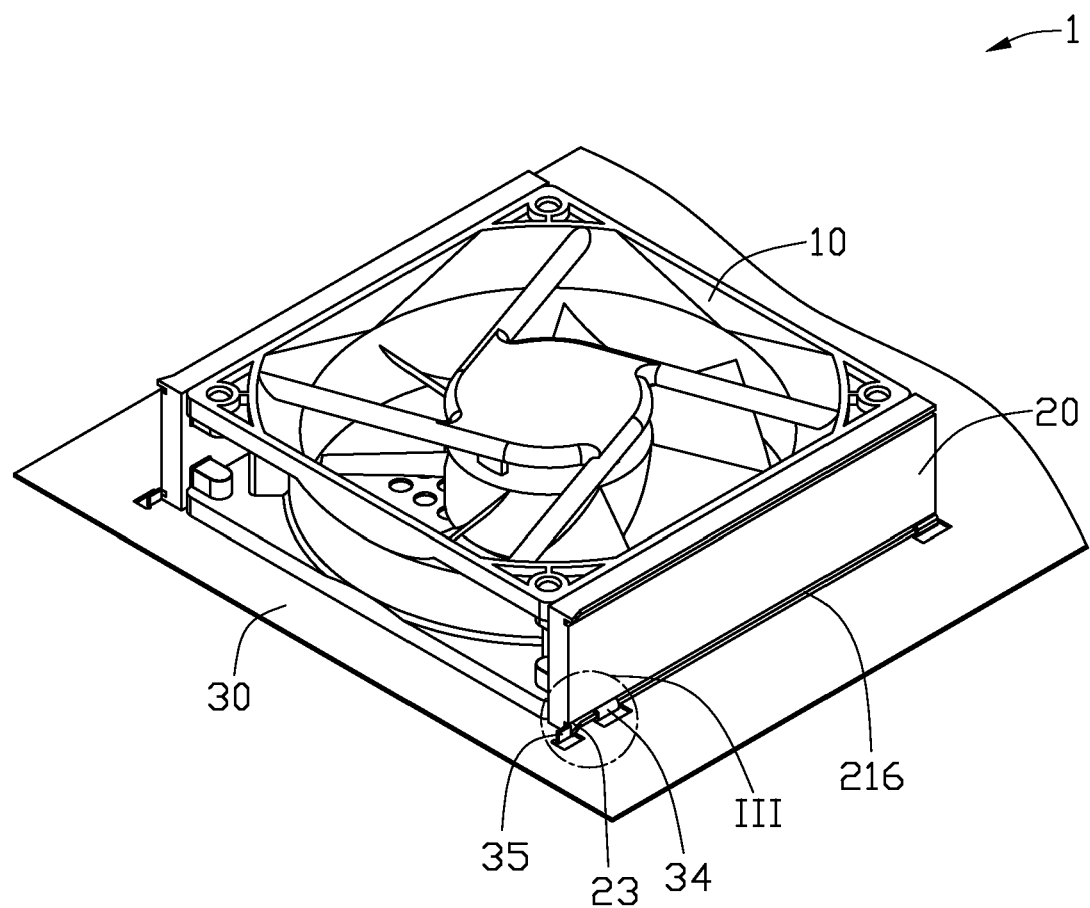
FIG. 2 is an assembled, isometric view of the fan assembly of FIG. 1.
Figure 3:
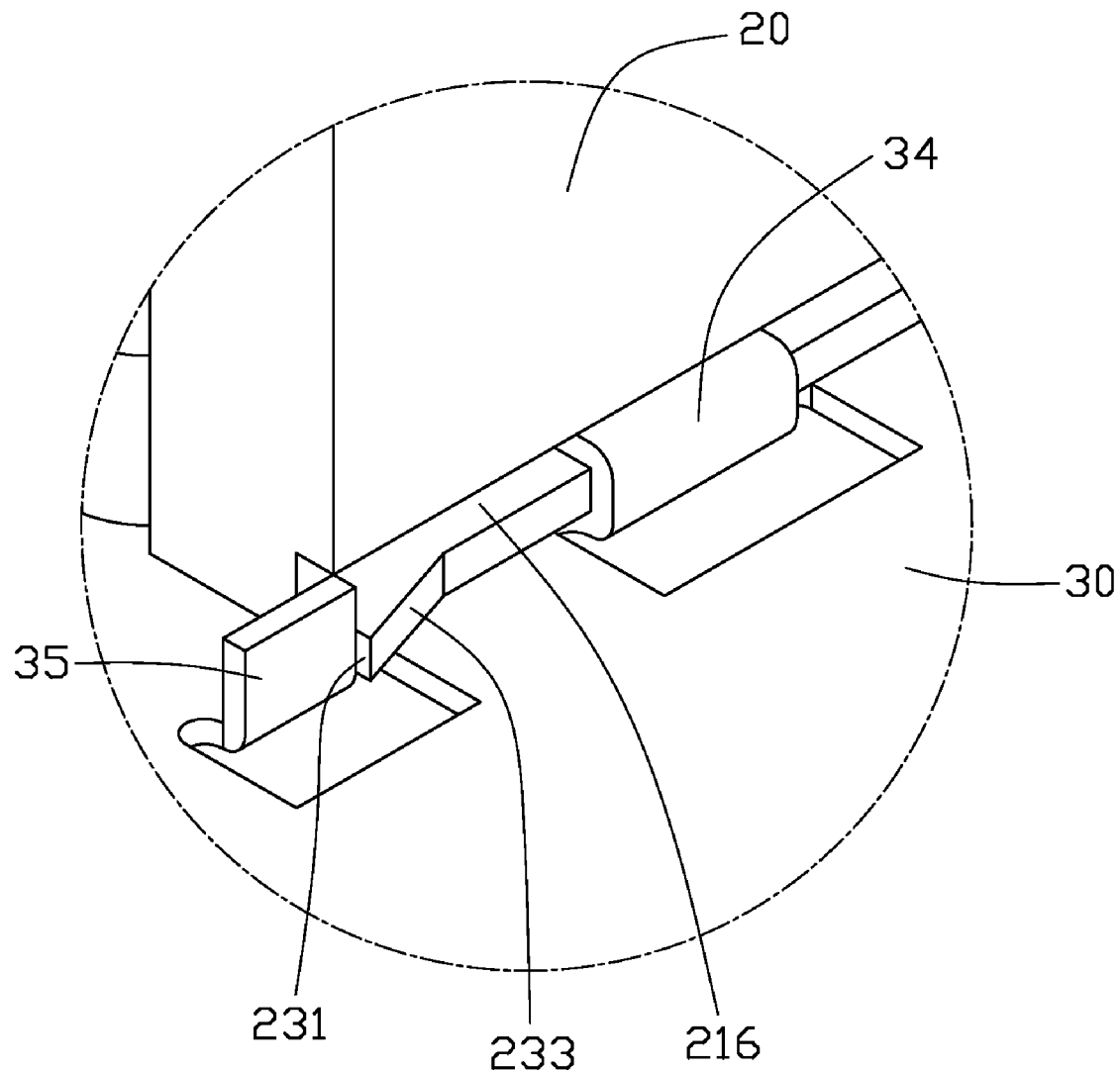
FIG. 3 is an enlarged, isometric view of a circled portion III of FIG. 2.

Referring to FIGS. 2 and 3, in assembly, the mounting members 20 are fixed to opposite lateral sides of the fan 10, with the latching arms 25 sandwiched between the walls 121 of the fan 10, and the latching portions 253 engaging in the corresponding fixing holes 123 of the walls 121. The blocks 23 of the mounting members 20 are located adjacent to a same end of the fan 10. The fan 10 together with the mounting members 20 are slid to the ventilation area 31 of the fixing plate 30 from a space between the resilient tabs 35. The engaging members 34 correspondingly engage in the corresponding recesses 216 adjacent to the fixing plate 30 of the mounting members 20. The fan 10 and the mounting members 20 are slid along the engaging members 34. The slanted surfaces 233 of the blocks 23, adjacent to the fixing plate 30, abut against the resilient tabs 35 of the fixing plate 30 and deform the resilient tabs 35 outwardly. The fan 10 and the mounting members 20 are further slid until an end of the fan 10 away from the blocks 23 resists against the stop plate 36 of the fixing plate 30. The slanted surfaces 233 of the blocks 23 adjacent to the fixing plate 30 are disengaged from the resilient tabs 35, and the resilient tabs 35 are restored to resist against the engaging surfaces 231 of the corresponding blocks 23. Therefore, the fan 10 is mounted on the fixing plate 30.

To detach the fan 10 from the fixing plate 30, the resilient tabs 35 of the fixing plate 30 are driven to disengage with the engaging surfaces 231 of the mounting members 20. Therefore, the fan 10 together with the mounting members 20 can be conveniently drawn out from the fixing plate 30.

In this embodiment, each mounting member 20 has a recess 216 and a block 23 adjacent to a bottom of the mounting member 20, and also has a recess 216 and a block 23 adjacent to a top of the mounting member 20. Therefore, when the mounting members 20 are fixed to the fan 10, the fan 10 together with the mounting members 20 can be mounted on the fixing plate 30, or be invertedly mounted on the fixing plate 30.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A fan assembly comprising:
   a fan;
   two mounting members fixed to opposite sides of the fan, each of the mounting members comprising an inner wall facing the fan and an outer wall away from the fan, the outer wall of each of the mounting members defining a recess and forming a block adjacent to a bottom of the mounting member, wherein the blocks of the mounting members are adjacent to a first end of the fan, each recess extends through opposite ends of the mounting member which are respectively adjacent to the first end and a second end of the fan opposite to the first end; and a fixing plate comprising at least two engaging members correspondingly engaging with the recesses of the mounting members, a stop plate engaging with the second end of the fan, and two resilient tabs respectively resisting against the blocks of the mounting members to sandwich the fan between the resilient tabs and the stop plate.

2. The fan assembly of claim 1, wherein each of the blocks comprises an engaging surface adjacent to the first end of the fan, and a slanted surface slanted connected between the engaging surface and the outer wall of the corresponding mounting member.

3. The fan assembly of claim 2, wherein each of the blocks is arranged between the recess and the bottom of a corresponding mounting member.

4. The fan assembly of claim 2, wherein each of the blocks is right-angled triangle shaped, and the engaging surface of each of the blocks is perpendicular to the outer wall of a corresponding mounting member.

5. The fan assembly of claim 1, wherein the fan comprises two opposite walls each defining four fixing holes adjacent to four corners of the wall, four latching arms extend from four corners of the inner wall of each of the mounting members, each latching arm comprises a latching portion extending towards a corresponding wall of the fan, to engage in a corresponding fixing hole of the fan.

6. The fan assembly of claim 1, wherein the fixing plate comprises a ventilation area among the engaging members, the resilient tabs, and the stop plate, the ventilation area defines a plurality of vents, the fan aligning with the plurality of vents.

7. The fan assembly of claim 1, wherein the outer wall of each of the mounting members further defines a recess and forms a block adjacent to a top of the mounting member, the blocks adjacent to the top the corresponding mounting member are adjacent to the first end of the fan.

8. A fan assembly comprising:

a fan;

two mounting members fixed to opposite sides of the fan, each of the mounting members comprising an inner wall facing the fan and an outer wall away from the fan, the outer wall of each of the mounting members defining a recess and forming a block adjacent to a bottom of the mounting member, wherein the blocks of the mounting members are adjacent to a first end of the fan, and each of the blocks is arranged between the recess and the bottom of a corresponding mounting member; and a fixing plate comprising at least two engaging members correspondingly engaging with the recesses of the mounting members, a stop plate engaging with a second end opposite to the first end of the fan, and two resilient tabs respectively resisting against the blocks of the mounting members to sandwich the fan between the resilient tabs and the stop plate.

9. A fan assembly comprising:

a fan;

two mounting members fixed to opposite sides of the fan, each of the mounting members comprising an inner wall facing the fan and an outer wall away from the fan, the outer wall of each of the mounting members defining a recess and forming a block adjacent to a bottom of the mounting member, wherein the blocks of the mounting members are adjacent to a first end of the fan, each of the blocks comprises an engaging surface adjacent to the first end of the fan, and a slanted surface slanted connected between the engaging surface and the outer wall of the corresponding mounting member, each of the blocks is right-angled triangle shaped, and the engaging surface of each of the blocks is perpendicular to the outer wall of a corresponding mounting member; and a fixing plate comprising at least two engaging members correspondingly engaging with the recesses of the mounting members, a stop plate engaging with a second end opposite to the first end of the fan, and two resilient tabs respectively resisting against the blocks of the mounting members to sandwich the fan between the resilient tabs and the stop plate.

* * * * *